(12) United States Patent
Larson

(10) Patent No.: US 10,625,959 B2
(45) Date of Patent: Apr. 21, 2020

(54) DUST CONTROL DEVICE

(71) Applicant: Todd A. Larson, Glyndon, MN (US)

(72) Inventor: Todd A. Larson, Glyndon, MN (US)

( * ) Notice: Subject to any disclaimer, the term of this patent is extended or adjusted under 35 U.S.C. 154(b) by 95 days.

(21) Appl. No.: 15/906,471

(22) Filed: Feb. 27, 2018

(65) Prior Publication Data

US 2019/0263606 A1  Aug. 29, 2019

(51) Int. Cl.
*B65G 69/18* (2006.01)
*B65G 67/06* (2006.01)
*B65G 67/22* (2006.01)

(52) U.S. Cl.
CPC ............. *B65G 67/22* (2013.01); *B65G 67/06* (2013.01); *B65G 69/187* (2013.01)

(58) Field of Classification Search
CPC .................. B65G 69/18–69/188; B65G 67/06
USPC ...... 141/8, 59, 60, 61, 65, 93; 414/291, 299, 414/397
See application file for complete search history.

(56) References Cited

U.S. PATENT DOCUMENTS

| | | | |
|---|---|---|---|
| 3,868,238 A * | 2/1975 | Mills, Jr. | ............ B01D 46/0067 96/427 |
| 4,061,221 A | 12/1977 | Higashinaka | |
| 4,125,195 A | 11/1978 | Sasadi | |
| 4,699,187 A | 10/1987 | Binzen | |
| 4,909,288 A | 3/1990 | Sommer | |
| 5,195,851 A | 3/1993 | Shepard | |
| 5,427,491 A | 6/1995 | Duffy | |
| 5,881,780 A | 3/1999 | Matye | |
| 6,499,929 B1 | 12/2002 | Salgado | |
| 9,499,348 B2 | 11/2016 | Teichrob | |
| 9,868,598 B2 | 1/2018 | Oren | |

\* cited by examiner

*Primary Examiner* — Marina A Tietjen
*Assistant Examiner* — Paul J Gray
(74) *Attorney, Agent, or Firm* — Neustel Law Offices

(57) ABSTRACT

A dust control device for preventing dust and debris from escaping into the atmosphere during the process of loading rail cars with grain or other granular commodities/products. The dust control device generally includes a dust hood that is moveably supported on a pair of stationary elongated support rails via wheels. The support rails are attached to a delivery spout of an elevator and extend over the path of travel of a rail car to be loaded. An elongated pivotable engagement arm connected to the dust hood extends downwardly into the path of the rail car and is engaged as the car passes beneath the dust hood. The dust hood moves with the rail car from a ready position to an operational position in close proximity to the delivery spout to capture the dust and debris generated during the loading process. When the rail car disengages from the engagement arm, the dust hood returns to the ready position automatically and without a power source under the force exerted by a spring-biased positioning assembly.

35 Claims, 13 Drawing Sheets

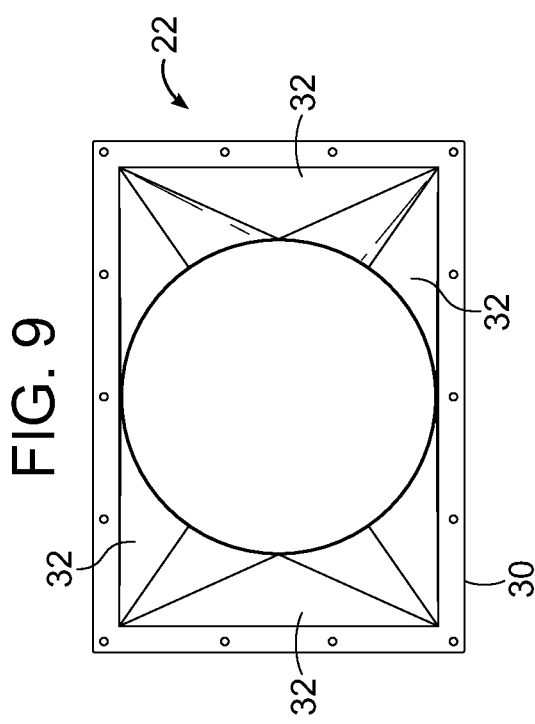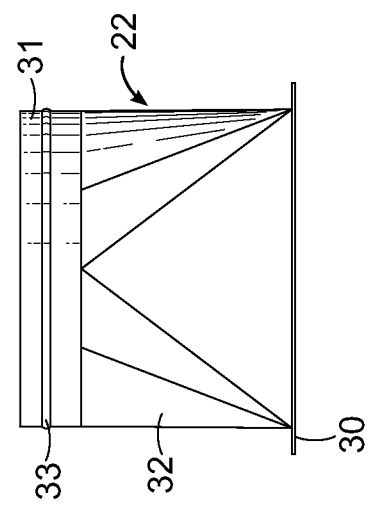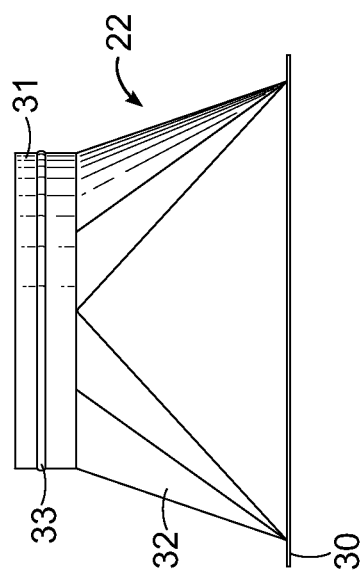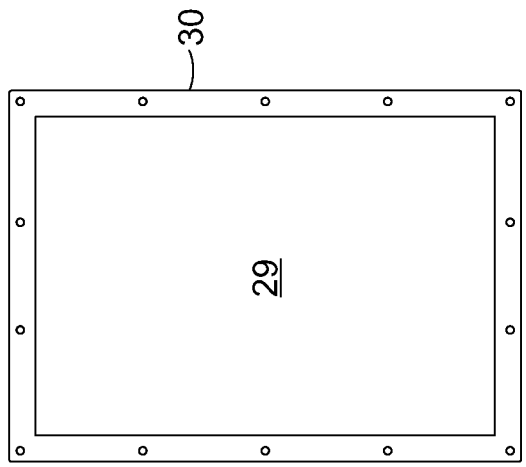

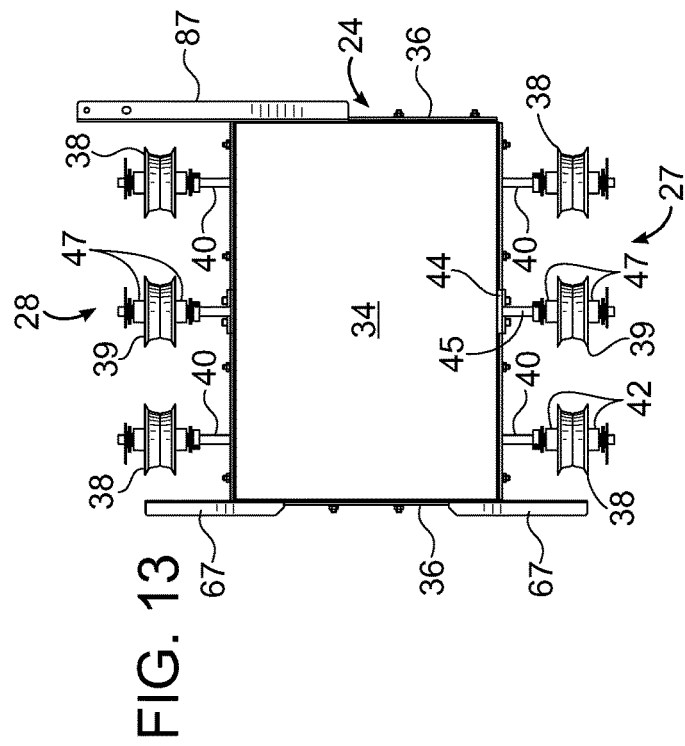
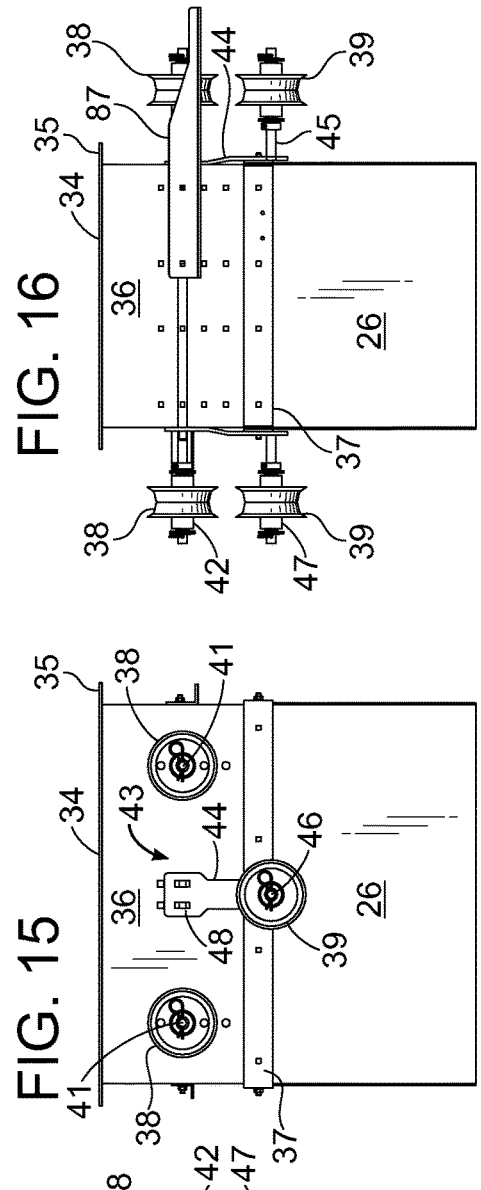
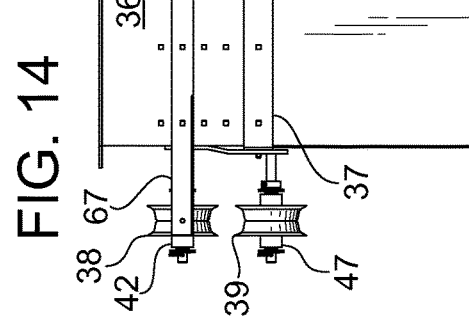

DUST CONTROL DEVICE

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a dust control device for preventing dust and debris from escaping into the atmosphere during the process of loading rail cars and other vehicles with grain or other dusty granular commodities/products.

Related Art

Any discussion of the related art throughout the specification should in no way be considered as an admission that such related art is widely known or forms part of common general knowledge in the field.

Rail cars referred to as tank cars or hopper cars are commonly used to ship large quantities of grains and other granular commodities/products. To receive a load of grain or another granular commodity or product, a rail car may be moved on rails beneath an elevator or associated filling station. Grain or another granular commodity/product is then loaded into the car through one or more openings typically in the top of the car. The grain or other granular commodity/product is typically delivered through a delivery spout or chute connected to the elevator or filling station. The car may and often does continue to move relative to the spout or chute as it is being loaded to facilitate full loading and even distribution of the load.

As the car moves and is filled, the air inside the car is displaced by the grain or other granular commodity/product being loaded and a significant amount of dust and small debris is generated. The dust and debris are forced out of the opening or openings in the top of the car and into the surrounding atmosphere. The dust and debris can create breathing and other health issues for workers. It can be spread by the wind so that it also becomes a concern for the well-being of nearby neighbors and their properties. It also can cause other environmental concerns for nearby wildlife and habitats. The escaping dust and debris also could violate various emissions, workplace safety, and or environmental protection laws and regulations.

Several approaches have been proposed in the prior art to deal with the dust and debris generated during the loading of various types of vehicles. One approach proposes to extend the open end of an elongated enclosed delivery tube into the interior volume of a vehicle being loaded. The position of the delivery tube is longitudinally-adjustable relative to the vehicle via a drive motor. Another approach proposes fitting a stationary tent-shaped cover over and around the circumference of a loading hatch of a vehicle being loaded. Still another approach proposes sealably connecting the ends of spout assemblies to loading inlets of a vehicle being loaded via hardware fittings. Despite the prior art proposals, various problems remain unresolved and various needs remain.

What is needed is a device that can effectively and efficiently capture a substantial amount of the dust and debris generated during the loading of grains and other dusty granular commodities/products into a rail car or other vehicle and that can substantially prevent the escape of the dust and debris into the atmosphere. Also needed is such a device that can effectively and efficiently capture the dust and debris and prevent its escape while the rail car or other vehicle is moving during the loading process. Also needed is such a device that can move with the rail car or other vehicle during the loading process in order to maintain effective capture of the dust and debris, and that can reset its position for use with successive compartments, rail cars or other vehicles to be loaded once the loading process is completed without the need for an external power or motive source. Also what is needed is such a device that can be readily retrofitted to an existing elevator or filling station without the need for substantial structural alterations. The embodiments of a dust control device disclosed herein address these needs and the various problems and shortcomings of the prior art.

SUMMARY

Example embodiments are directed to a dust control device comprising a dust hood, a pair of elongated support arms, a spring-biased positioning assembly, and a dust hood engagement structure.

The dust hood is shaped to define an interior volume in which dust and debris that would otherwise escape into the atmosphere can be captured. The dust hood is adapted to be moveably supported on the elongated arms. The elongated arms are adapted to be attached to and to extend outwardly from the delivery spout of a grain elevator or filling station over the path a rail car or other vehicle traverses as it passes under the delivery spout for loading.

The spring-biased positioning assembly is connected to the dust hood and the elongated arms. In the absence of a rail car or other vehicle to be loaded, the spring-biased assembly maintains the dust hood in a ready position supported on the arms and spaced apart from the delivery spout.

The dust hood engagement structure is attached to the dust hood and is adapted to be engaged by a rail car or other vehicle as it passes beneath the dust hood and continues to move toward and beneath the delivery spout during the loading process. This causes the dust hood to move with the compartment, rail car or other vehicle to be loaded from the ready position to a position in close proximity with the delivery spout. As the rail car continues to move under the delivery spout during the loading process, the dust hood is maintained in close proximity to the point of delivery of the grain or other dusty granular commodity/product. In this position, the dust hood is capable of capturing a substantial amount of the dust and debris generated during the loading process and of substantially preventing the dust and debris from escaping into the atmosphere. As the compartment, rail car or other vehicle moves past the delivery spout upon completion of loading, it disengages from the dust hood, which then automatically returns to its first position under the force of the spring-biased assembly.

There has thus been outlined, rather broadly, an embodiment of the dust control device in order that the detailed description thereof may be better understood, and in order that the present contribution to the art may be better appreciated. There are additional aspects and features of the dust control device that will be described hereinafter and that will form the subject matter of the claims appended hereto. In this respect, before explaining at least one embodiment of the dust control device in detail, it is to be understood that the dust control device is not limited in its application to the details of construction or to the arrangements of the components set forth in the following description or illustrated in the drawings. The dust control device is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 9 is a top plan view of the upper section of a dust hood of a dust control device in accordance with an example embodiment.

FIG. 10 is a bottom plan view of the upper section of a dust hood of a dust control device in accordance with an example embodiment.

FIG. 11 is a side perspective view of the upper section of a dust hood of a dust control device in accordance with an example embodiment.

FIG. 12 is a side perspective view of the upper section of a dust hood of a dust control device in accordance with an example embodiment rotated by 90 degrees from the view in FIG. 11.

FIG. 13 is a top plan view of the lower section of a dust hood of a dust control device in accordance with an example embodiment.

FIG. 14 is an end view of the lower section of a dust hood of a dust control device in accordance with an example embodiment.

FIG. 15 is a side perspective view of the lower section of a dust hood of a dust control device in accordance with an example embodiment.

FIG. 16 is an end view of the lower section of a dust hood of a dust control device in accordance with an example embodiment rotated 180 degrees from the view in FIG. 14.

DETAILED DESCRIPTION

Figure 1:
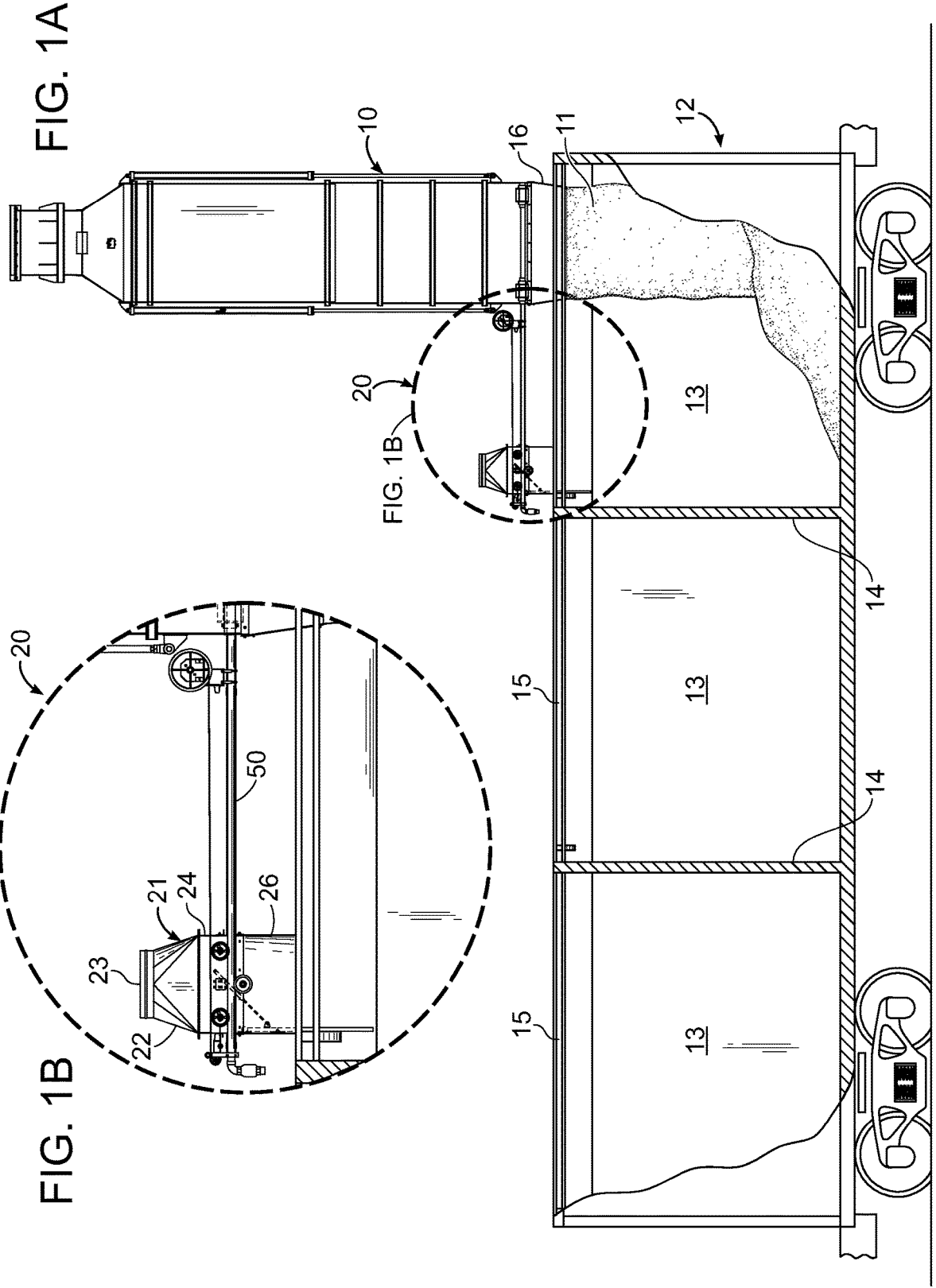
FIG. 1A is a side perspective view of a dust control device in accordance with an example embodiment showing the device connected to a grain loading facility with the device in a ready position and a rail car to be loaded illustrated in partial cross section.
FIG. 1B is an enlarged breakout of the dust control device of FIG. 1A in accordance with an example embodiment.
Figure 2:
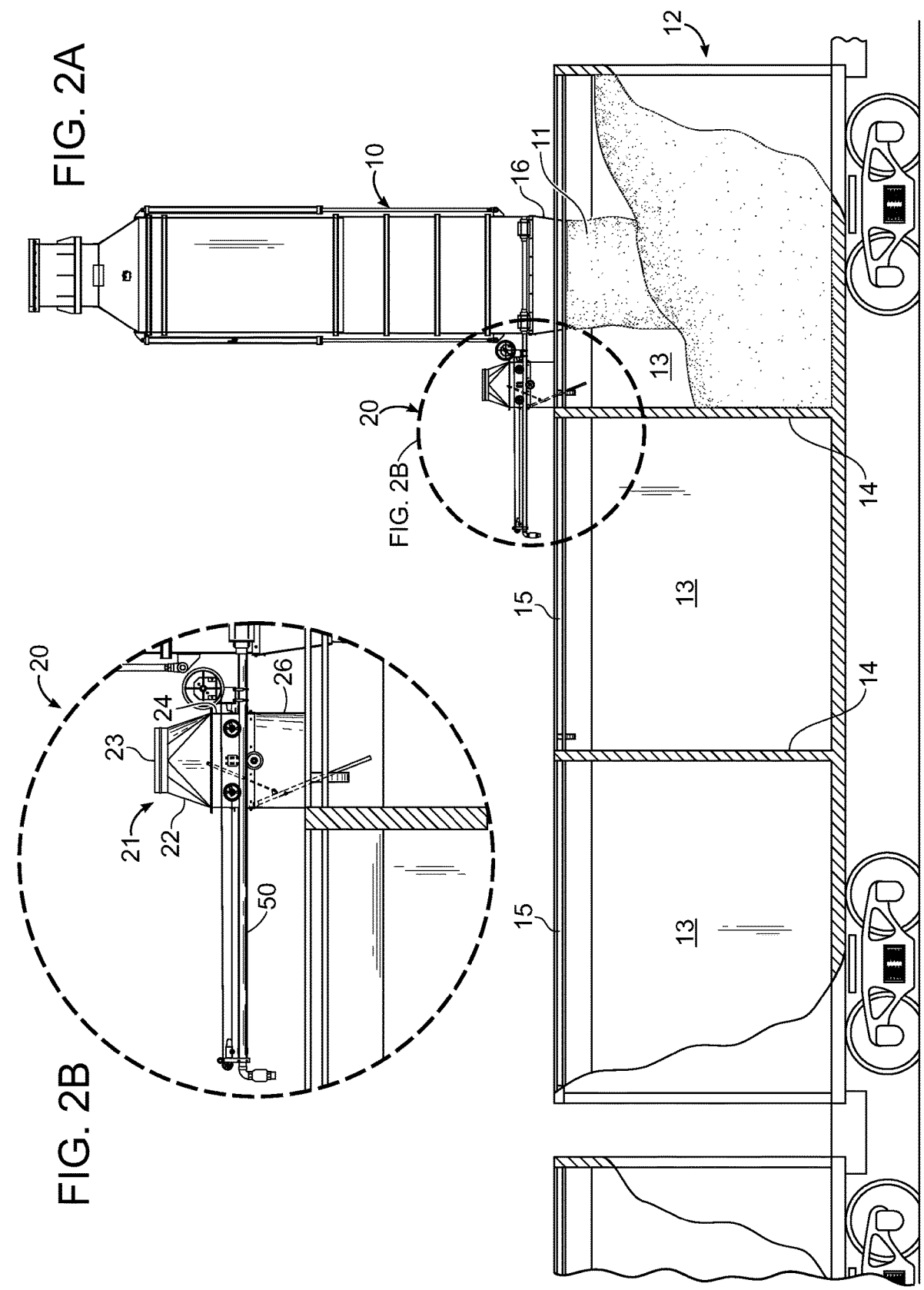
FIG. 2A is a side perspective view of a dust control device in accordance with an example embodiment showing the device connected to a grain loading facility with the device in an operational position and a rail car being loaded illustrated in partial cross section.
FIG. 2B is an enlarged breakout of the dust control device of FIG. 2A in accordance with an example embodiment.
Figure 3:
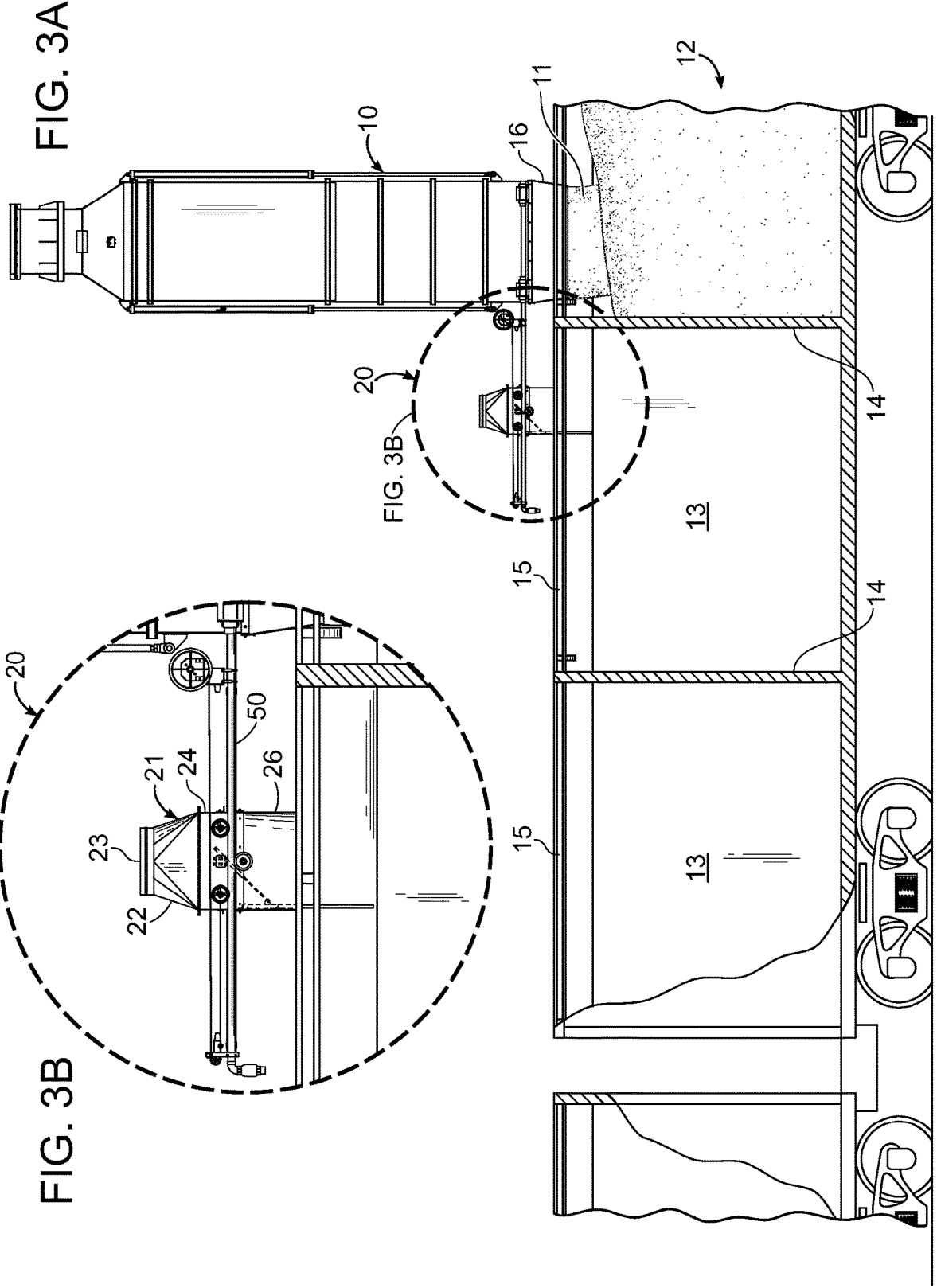
FIG. 3A is a side perspective view of a dust control device in accordance with an example embodiment showing the device connected to a grain loading facility with the device in an intermediate position and a rail car with a partially loaded compartment illustrated in partial cross section.
FIG. 3B is an enlarged breakout of the dust control device of FIG. 3A in accordance with an example embodiment.
Figure 4:
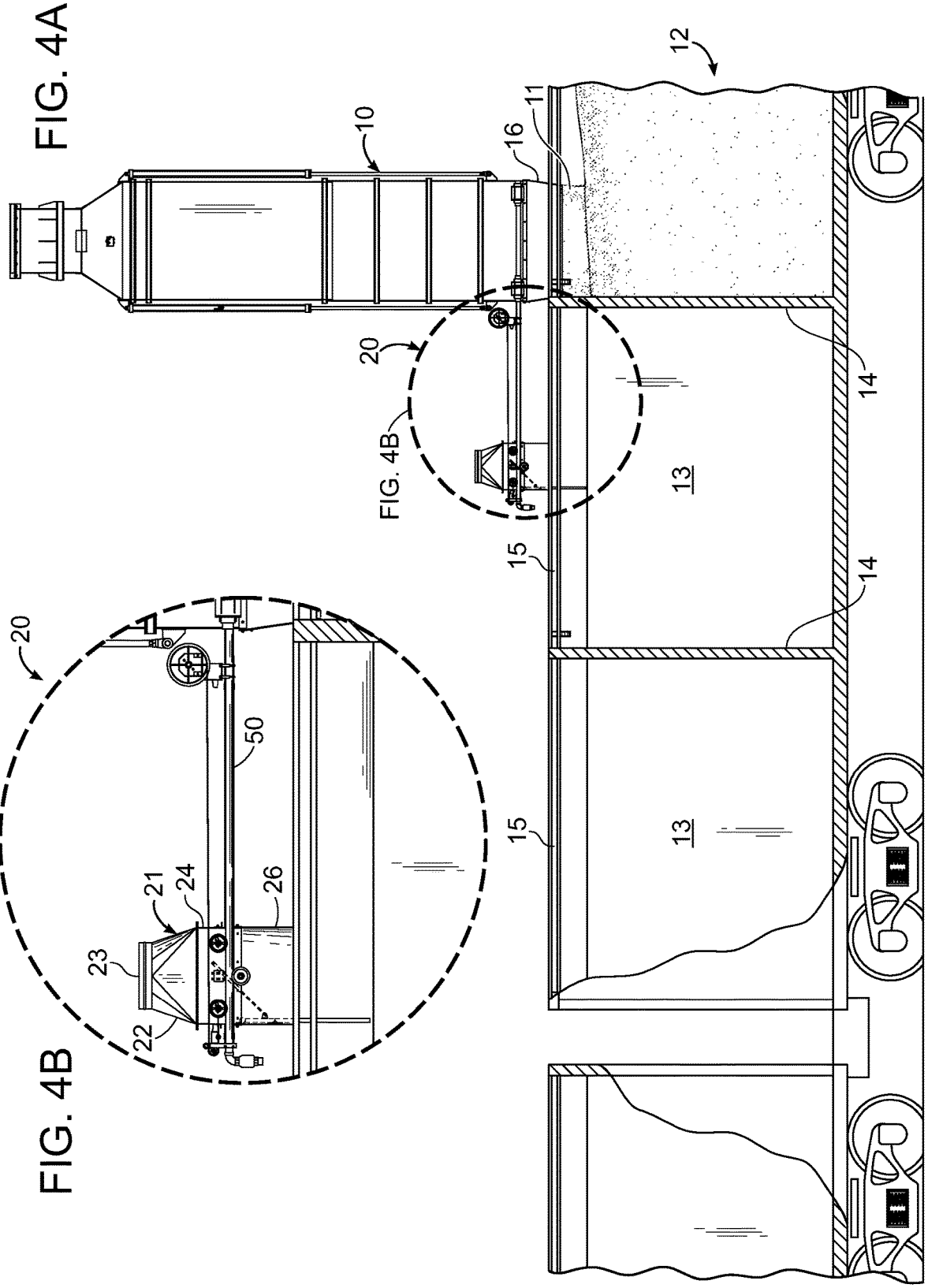
FIG. 4A is a side perspective view of a dust control device in accordance with an example embodiment showing the device connected to a grain loading facility with the device returned to the ready position and a rail car with a fully loaded compartment illustrated in partial cross section.
FIG. 4B is an enlarged breakout of the dust control device of FIG. 4A in accordance with an example embodiment.
Figure 5:
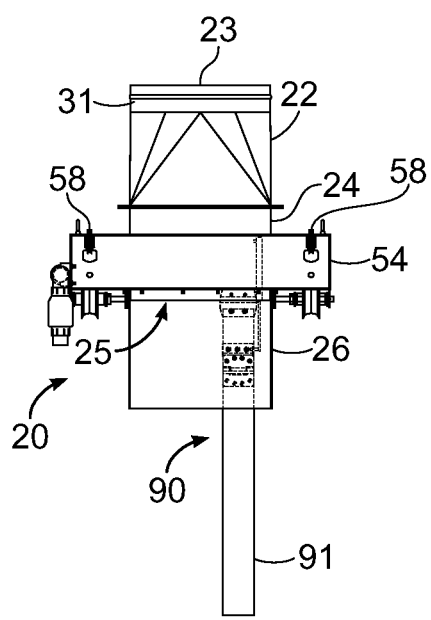
FIG. 5 is a longitudinal end view of a dust control device in accordance with an example embodiment.
Figure 6:
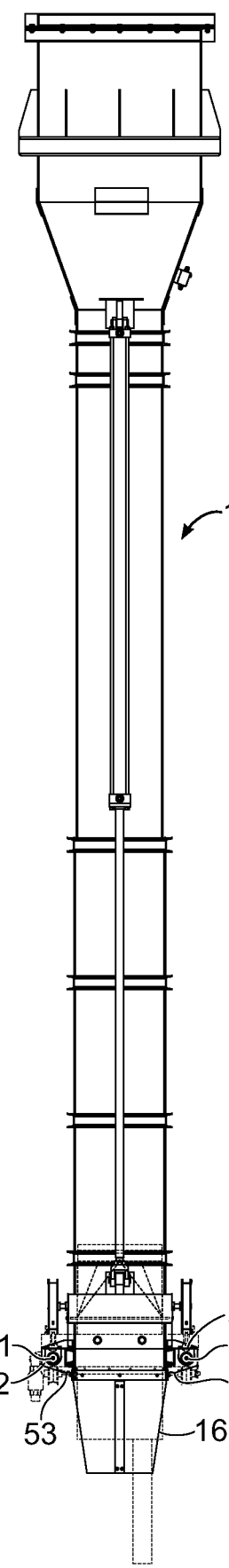
FIG. 6 is a longitudinal end view of a dust control device in accordance with an example embodiment showing the device connected to a grain loading facility and partially transparent to reveal components of the grain loading facility.
Figure 7:
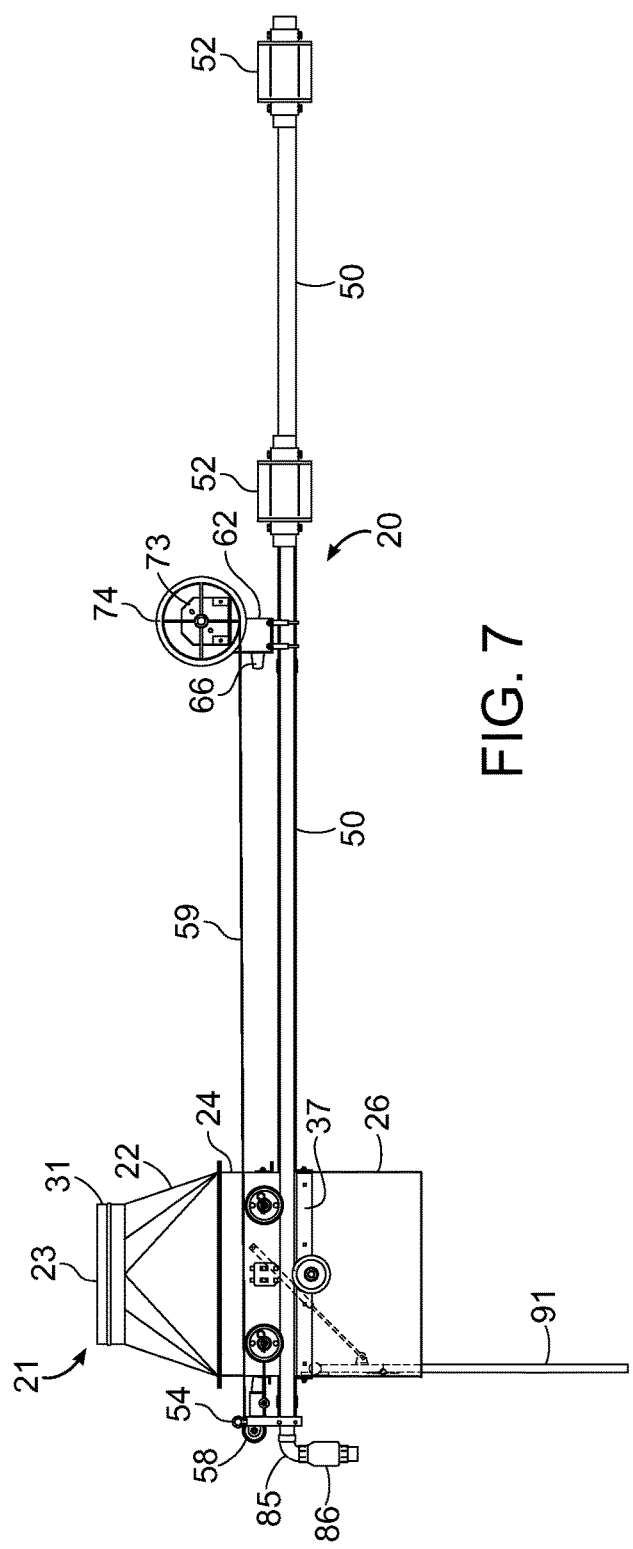
FIG. 7 is a side perspective view of a dust control device in accordance with an example embodiment.

For the sake of brevity, in the description that follows references to grain also are intended to encompass other types of agricultural commodities and other granular commodities/products that may generate dust during a loading process. In addition, references to dust also are intended to encompass other types of micro-debris. References to rail cars also are intended to encompass other types of vehicles that may be loaded with grain or other granular commodities/products. References to rails in connection with rail cars also are intended to encompass other prescribed paths of travel whether or not defined by fixed rails. References to elevators are intended to encompass elevators for grain and other agricultural commodities as well as other types of granular commodities/products, and to include structures similar or related to elevators including filling stations. References to delivery spouts are intended to encompass other types of delivery mechanisms such as chutes, conduits, and the like.

A. Overview

An example dust control device generally includes a dust hood, a pair of stationary elongated support rails, a spring-biased positioning assembly, and a dust hood engagement structure. The dust hood is shaped to define an interior volume for capturing dust generated during the process of loading a rail car with grain and that would otherwise escape into the atmosphere.

The dust hood is moveably supported on the pair of stationary elongated support rails via sets of wheels. The support rails are attached at or near their proximal ends to a delivery spout of an existing elevator. The support rails extend outwardly from the delivery spout over the path of travel a rail car to be loaded traverses as it approaches and passes under the delivery spout for loading. A first stop structure for the dust hood is connected between the support rails at their distal ends and a second stop structure is connected between the rails at a location in close proximity to the delivery spout. The dust cover is reciprocally moveable on the support rails between the first and second stops, which correspond with ready and operational positions of the dust hood respectively.

The spring-biased positioning assembly comprises a shaft-mounted tension spring. The positioning assembly is mounted above the support rails in close proximity to the delivery spout. The shaft-mounted tension spring is connected to the dust hood by an arrangement of wire ropes or cables and rotatable pulley wheels. The positioning assembly is operative automatically and without a power source to cause the dust hood to move on the support arms into the ready position adjacent the first stop in the absence of a rail car to be loaded.

An air damper comprises a pair of elongated outer and inner pipes with the outer pipe being connected to and moveable with the dust hood and the inner pipe being connected to the first stop and stationary. The inner pipe extends within the outer pipe and the outer pipe is slideable over the inner pipe with movement of the dust stop. The damper draws in and traps air when the dust hood moves away from the ready position and forces the trapped air out when the dust hood moves toward the ready position. This generates a counter force that resists movement of the dust hood to the ready position under the force of the positioning assembly thus slowing the movement of the dust hood and damping the force with which it engages the first stop.

The dust hood engagement structure comprises a pivotable elongated engagement arm that is connected to and extends downwardly from the dust hood into the path the rail car to be loaded traverses as it approaches and passes under the delivery spout. The arm is adapted to be engaged by a bulkhead or other component of the rail car as it passes beneath the dust hood so that the dust hood moves with the rail car from the ready position to the operational position adjacent to the second stop and in close proximity to the delivery spout. In the operational position the dust hood is capable of substantially capturing the dust generated while an internal compartment of the rail car is being loaded with grain via the delivery spout. The dust hood automatically returns to the ready position under the force of the positioning assembly when a bulkhead or other component of the rail car disengages from the engagement arm. The dust hood moves with the rail car and returns to the operational position as each bulkhead of a compartment of the rail car engages the arm.

B. Environment

Referring primarily to FIGS. 1-4 and 6, an elevator 10 is used to contain grain 11 to be loaded into rail cars 12. A rail car for hauling grain may be referred to as a hopper and typically has several internal compartments 13 separated by bulkheads 14. Each of the compartments has a top opening 15 for receiving the grain being loaded from the elevator or filling station.

Typically, the elevator has a delivery spout 16 that functions to deliver the grain into a rail car through the top openings. During a loading process, the rail car moves on rails along a path that approaches and passes beneath the delivery spout so that the top opening of a compartment to be loaded is aligned beneath the delivery spout. Once the compartment is filled with grain from the spout, the car moves on so that the next compartment becomes aligned beneath the spout for loading, and so on. When each compartment of the car has been loaded, the process continues with the next car to be loaded.

It is noted that while the example dust control device of the present invention is adapted to work and to be used with an existing elevator having a delivery spout for loading moveable rail cars, as generally described above, neither the elevator and delivery spout nor the moveable rail cars form any part of the present invention. Details of the elevator, delivery spout, and moveable rail cars that are not necessary to a full understanding of the invention are therefore omitted.

C. Dust Hood

Referring generally to FIGS. 1-5 and 7-8, an example dust control device 20 having as one component a dust hood 21 is illustrated. Referring more specifically to FIGS. 9-16 and 20, the dust hood comprises an enclosed tapered approximately dome-shaped hollow upper section 22 with a top opening 23, an enclosed hollow lower section 24 with a bottom opening 25, and a lower skirt 26 that extends downwardly from the lower section and extends substantially around the periphery of the lower section. The dust hood also comprises a pair of rotatable wheel assemblies 27, 28.

The dust hood 21 is adapted to capture the dust generated during the loading of grain into a rail car at its bottom opening 25 and to direct the dust into the enclosed lower 24 and upper 22 sections instead of allowing it to escape into the atmosphere. Preferably the top opening 23 is adapted to be connected by a flexible hose, conduit or the like (not shown) to a dust containment apparatus (not shown) of elevator 10 or another grain storage and loading facility. The dust containment apparatus may and typically does include a blower or fan to pull dust and debris generated during the loading of grain through the dust hood and into the containment apparatus for appropriate filtering and/or other processing.

The dust hood 21 may be constructed in a variety of shapes and using a variety of materials consistent with the purposes and functioning of the hood as described herein. In a presently preferred embodiment, both the upper section 22 and the lower section 24 are constructed of a substantially rigid metallic material. The upper section has an open bottom 29 with a substantially rectangular cross-section. The top opening 23 of the upper section has a substantially circular cross-section and a somewhat smaller cross-sectional area than the bottom opening. A horizontal flange 30 extends substantially around the periphery of the open bottom 29 and a vertical collar 31 extends substantially around the periphery of the circular top opening 23. A plurality of side walls 32 extend upwardly from the flange 30 and taper inwardly to meet the base of the vertical collar 31 around the top opening 23. The collar may be provided with a circular bead 33 if desired to facilitate connection between the collar and a flexible hose, conduit or the like (not shown) leading to a dust containment apparatus (not shown) of a grain storage and loading facility, as described above. The side walls 32 define an enclosed hollow interior space and passageway between the open bottom 29 of the upper section and the top opening 23.

The lower section 24 has an open top 34 with a substantially rectangular cross-section and substantially the same dimensions as the open bottom 29 of the upper section. A horizontal flange 35 extends substantially around the periphery of the open top 34. The flange 35 has substantially the same dimensions as the flange 30 of the upper section 22. A plurality of side walls 36 extend downwardly substantially vertically from the flange 30. The bottom edges of the side walls define the bottom opening 25 of the dust hood, which has a substantially rectangular cross-section. The side walls 36 define a hollow interior space and passageway between the bottom opening 25 and the open top of the 34 of the lower section 24.

The horizontal flanges 30 and 35 of the upper and lower sections 22 and 24 respectively are seated against each other to assemble the upper and lower sections. The upper and lower sections are suitably secured together by drilling holes through the flanges and fastening them together with suitable bolts and nuts. Other suitable fasteners also can be used. Alternatively, the upper and lower sections can be permanently attached, for example by welding, or can be constructed as a single contiguous structure via suitable molding, forming, or other construction techniques well known in the art.

The lower skirt 26 extends downwardly from the bottom edges of the side walls 36 of the lower section 24 and extends substantially around the periphery of the bottom opening 25. The lower skirt is preferably constructed of a durable but relatively flexible material. The flexibility of the skirt helps ensure that if the skirt should come in contact with a component of a rail car passing beneath the dust hood, or with a mass of already-loaded grain or the like, substantial damage will not occur to either the components of the dust control device or to the rail car as a result. Suitable material for the skirt includes commercially available smooth rubber two-ply belt material. Other materials also may be used consistent with the purposes and functioning of the lower skirt as described herein.

The lower skirt 26 preferably comprises four separate pieces of material. Each separate piece is attached to a side wall 36 of the lower section 24 at or near the bottom edge of the wall. Alternatively, the skirt can comprise a single piece of material if desired. The skirt can be attached to the sidewalls in a variety of ways. In a presently preferred embodiment, the upper edge of each skirt piece can be glued to the surface of a side wall 36 near its bottom edge. An elongated backing plate 37 is then positioned over the glued sections and attached to the side wall by drilling and installing bolts and nuts. If desired, separate skirt pieces can be glued to the inner and outer surfaces of a side wall and backing plates can be attached to both the inner and outer surfaces. Attaching the skirt to the lower section in this manner not only provides a secure attachment, but one that can be reversed if it becomes necessary to replace a worn out or damaged piece of skirt material.

Two sets of rotatable wheels 27, 28 are attached to the dust hood on opposite sides thereof. The two sets of wheels moveably support the dust hood on a pair of elongated support rails 50, 51 and enable the dust hood to move on the support rails between ready and operational positions as described in detail below. Each set of wheels comprises three wheels: two upper wheels 38 and a lower wheel 39. The two upper wheels 38 of each set are spaced apart in a common horizontal plane. The lower wheel of each set is positioned between the upper wheels on a lower horizontal plane. All three wheels of each set are aligned in a common vertical plane with the dust hood being centered between the two wheel sets. The vertical distance between the horizontal planes of the upper wheels 38 and the lower wheel 39 of each wheel set 27, 28 is set so that the upper wheels 38 ride on a top surface of a corresponding elongated rail 50, 51 while the lower wheel 39 is engaged with the bottom surface of the corresponding elongated rail 50, 51.

The wheels 38, 39 may be constructed of a variety of materials and in a variety of shapes depending on the shape of the corresponding elongated support rails 50, 51. In a presently preferred embodiment, the wheels can be similar to the wheels of a rail car with an interior cupped portion between exterior raised or flanged portions. Such wheels are well adapted to securely engage, ride on and track substantially cylindrical-shaped support rails. As presently preferred, the wheels are constructed of a durable and rigid metallic material. Many other shapes and materials may be employed for the wheels consistent with the purposes and functioning thereof as described herein. Similarly, different numbers and arrangements of wheels may be used as desired or as required for particular applications.

Each upper wheel 38 of a set 27 is interconnected with the corresponding upper wheel 38 of the other set 28 by a rigid axle 40. Each upper wheel 38 is mounted on its corresponding axle 40 via a bearing set 41 so that the wheel is free to rotate on the axle as the dust hood moves along the elongated support rails as described below. Each upper wheel is securely held on the corresponding axle in the proper lateral position to ride on the corresponding elongated support rail by suitable commercially available shaft collars 42 and related hardware.

Each lower wheel 39 of each set 27, 28 is mounted to a wheel holder 43 that is connected to a side wall 36 of the lower section 24 of the dust hood. The wheel holder comprises a flat plate 44 that is adapted to be securely connected to the side wall by bolts or the like. A short wheel shaft 45 protrudes outward substantially perpendicularly from the flat plate. The plate and wheel shaft are preferably constructed of a durable rigid material such as a metal. Each lower wheel is mounted on a corresponding wheel shaft via a bearing set 46 so that the lower wheel is free to rotate on the shaft as the dust hood moves along the elongated support rails as described below. Each lower wheel is securely held on the corresponding wheel shaft in the proper lateral position to engage and track the bottom of the corresponding elongated support rail by suitable commercially available shaft collars 47 and related hardware.

The wheel holder 43 may include a vertical adjustment 48 to adjust the vertical distance between the lower wheel 39 and the corresponding upper wheels 38 of a wheel set so that the lower wheel securely engages and tracks on the bottom surface of the corresponding elongated support rail when the corresponding upper wheels are supported and tracking on the top surface of the rail. The vertical adjustment may comprise one or more vertically distributed holes and/or slots in the plate that align with holes and/or slots in the side wall 36 of the dust hood to allow the vertical position of the plate to be adjusted.

D. Elongated Support Rails

Referring primarily to FIGS. 1-4 and 7-8, a pair of stationary elongated support rails 50, 51 extends outwardly from the delivery spout 16 and provides a moveable support for the dust hood 21 via the wheel sets 27, 28 described above. The support rails are preferably constructed of a rigid and durable material. In a presently preferred embodiment, the support rails comprise 2" diameter schedule 40 round metal pipes. The support rails are arranged parallel to each other and extend outwardly in a common horizontal plane over the path to be traversed by a rail car to be loaded as it approaches and passes beneath the delivery spout. The support rails preferably extend outwardly from the delivery spout for a distance sufficient to ensure that the dust hood is engaged by a bulkhead or other component of the rail car as it approaches the delivery spout and can travel with the car to a point in close proximity to the delivery spout when the spout is aligned over the top opening of the first compartment of the car to be loaded. In a presently preferred embodiment, a distance of approximately 112 inches is deemed sufficient for use with standard size 3-compartment hopper cars.

Referring primarily to FIGS. 1-4 and 6-8, the pair of support rails 50, 51 is attached near first proximal ends to opposite sides of the delivery spout 16 by suitable rail mounts 52. As many rail mounts as necessary or desired may be used to securely attach the support rails to the sides of the delivery spout. In a presently preferred embodiment, each support rail is attached to a side of the delivery spout by two longitudinally spaced rail mounts 52. The rail mounts may include stand-offs 49 to space the support rails laterally from the sides of the delivery spout a desired distance. Preferably the rail mounts hold the rails securely in place. For example, the rail mounts may include openings through which the rails extend longitudinally and set bolts that hold the rails securely in place in the mounts when tightened.

Referring primarily to FIGS. 5, 7-8, and 17-19, the support rails are interconnected at their second distal ends by a back channel plate 54. The back channel plate preferably is constructed of a rigid and durable material, for example a suitable metal. The distal ends of the support rails may be securely attached or connected to the back channel plate in any suitable manner. For example, the ends may be closed off by flat plates and securely connected to the back channel plate using nuts and bolts or other suitable fasteners. Alternatively, the ends may be welded to the back channel plate.

The back channel plate serves several functions. It functions to securely and rigidly interconnect the distal ends of the support rails to provide rigidity to the overall structure, and to securely hold the rails in place laterally and in the parallel co-planar configuration described above. It also provides a mounting structure for various components as described herein. It also defines a starting or ready position for the dust hood and functions as a stop for the dust hood as it moves to that position following a loading operation as described in further detail below.

A face 55 of the back channel plate facing the dust hood 21 may therefore be fitted with bumper stops 56 for the dust hood to engage as it moves into the ready position. The bumper stops 56 may be mounted on standoffs 49. The bumper stops may be constructed of a rubber material or the like that is suitable for engaging and stopping the dust hood as it moves to the ready position without damaging the dust hood or the back channel plate.

Because the support rails 50, 51 may extend a significant distance from the delivery spout and may be required to support a fairly substantial amount of weight, it may be desirable to provide additional vertical support at their distal ends to prevent them from sagging downwardly and to ensure they remain in a substantially horizontal co-planar configuration as described above. Accordingly, eye bolts 57 or similar devices may be attached to the back channel plate 54 to facilitate the connection of wires, rods or other support structures (not shown). These in turn may be fastened to a surface of the grain elevator 10 or another suitable stationary structure of the loading facility to provide additional vertical support to the distal ends of the support rails as desired or necessary.

Also mounted on the back channel plate 54 is a pair of rotatable pulley wheels 58. The pulley wheels are adapted to rotatably route a pair of wire ropes 59 or cables from the spring-biased positioning assemble 70 described in detail below to the dust hood 21 in a manner to be described. The pulley wheels are mounted to the back channel plate in parallel with their axes of rotation arranged substantially perpendicular to the longitudinal direction of the support rails 50, 51, and are laterally spaced apart so that each pulley wheel is in longitudinal alignment with a corresponding support rail 50, 51 and wheel set 27, 28 of the dust hood. As will become apparent below, this arrangement allows the wire ropes or cables that extend from the spring-biased positioning assembly to follow a substantially linear path between the assembly and the dust hood. The pulley wheels may be mounted to the back channel plate in any suitable manner that provides secure attachment and allows them to freely rotate with movement of the wire ropes or cables. In a presently preferred embodiment, each back channel plate has a pulley slot 60 that extends vertically downward from a top surface of the plate to accommodate a pulley wheel 58. A mounting flange or ear 61 may extend outwardly from the back surface of the back channel plate opposite the dust hood on each lateral side of the pulley slot 60. A hole may be drilled through the opposing surfaces of the mounting flanges 61 and the pulley wheel 58 may be mounted between them on a bolt and/or other suitable hardware and extend into the pulley slot 60.

Referring primarily to FIGS. 1-4, 7-8, and 22-24, the support rails 50, 51 are also interconnected at a location intermediate their proximal and distal ends and in close proximity to the delivery spout 16 by a stationary mount 62. The mount preferably is constructed of a rigid and durable material, such as a suitable metal. The mount extends substantially transversely between and interconnects the support rails. The mount serves several functions. It securely and rigidly interconnects the support rails to provide rigidity to the overall structure, and to securely hold the rails in place laterally and in the parallel co-planar configuration described above. It also provides a mounting and support structure for various components including a spring-biased positioning assembly 70 as described below. Further, it defines an operational position for the dust hood and functions as a stop for the dust hood as it moves to that position during a loading operation as described below.

In a presently preferred embodiment, the mount 62 is shaped as a closed ended, elongated hollow beam having a substantially rectangular cross-section. One elongated side 63 of the beam facing the delivery spout may be left open. The mount is configured to be supported atop the elongated rails 50, 51 at opposite lateral ends. Accordingly, a substantially horizontal mounting flange 64 extends laterally outward from each end of the beam. Securely connected to each mounting flange is a pair of longitudinally-spaced downward extending U-bolts or other suitable fasteners. The support rails extend through the U-bolts. The vertical standoff of the mount relative to the support rails is determined and can be adjusted by selecting and altering the dimensions of the vertical legs of the U-bolts as necessary or desired.

As referred to above, the mount 62 functions as a mounting and support platform for a spring-biased positioning assembly 70 which is described in detail below. As also described below, the assembly may be securely mounted to the substantially horizontal flat top surface of the mount using nuts and bolts or other suitable fasteners.

As also referred to above, the positioning of the mount 62 on the support rails 50, 51 in close proximity to the delivery spout 16 defines an operational position for the dust hood and functions as a stop for the dust hood as it moves into that position during a loading operation as a rail car or other vehicle moves under the delivery spout. Accordingly, an elongated side 65 of the beam that faces away from the delivery spout may be fitted with bumper stops 66 for the dust hood to engage as it moves into the operational position. The bumper stops may be constructed of rubber or another material that is suitable for engaging and stopping the dust hood as it moves into the operational position and contacts the mount 62 without damaging the dust hood or the mounting bracket.

E. Spring-Biased Positioning Assembly

Referring primarily to FIGS. 1-4, 7-8, and 22-25, in a presently preferred embodiment the spring-biased positioning assembly 70 comprises a tensioned torsion spring 71 mounted on a rotatable shaft 72, a pair of mounting brackets 73, a pair of pulley wheels 74, and a pair of elongated wire ropes or cables 59.

The mounting brackets 73 preferably comprise L-shaped brackets constructed of a rigid and durable material such as a suitable metal. The mounting brackets are mounted via their horizontal surfaces to the top surface of the mount 62 using bolts and nuts or other suitable fasteners as described above. The mounting brackets are mounted at or near the opposite lateral ends of the mount 62 with their vertical surfaces facing. The vertical surface of each mounting bracket has a substantially circular opening with a bearing assembly 75. The opposite lateral ends of the shaft 72 extend through and are rotatably supported in the openings and bearing assemblies and thus the shaft is able to freely rotate between the mounting brackets. Preferably the openings are positioned at the same height above the top surface of the mount 62 so that the shaft 72 (and the torsion spring 71 mounted thereon) are supported by the brackets in a substantially horizontal configuration. Also preferably, the openings are positioned a sufficient vertical distance above the top surface of the mount 62 that the bottom extents of the pulley wheels 74 mounted to the ends of the shaft 72 as described below lie in the same horizontal plane as the top extents of the pulley wheels 58 mounted on the back channel plate 54 as described above.

The torsion spring 71 and shaft 72 are configured and connected to each in substantially the same way as in well-known garage door openers. One end of the spring is fixedly connected to one of the stationary mounting brackets 73 or to another stationary component and is prevented from rotating with the shaft. The opposite end of the spring is attached to the shaft via a collar 76 or other suitable connector and is able to rotate with the shaft. Accordingly, as the shaft rotates in one direction the spring compresses and as the shaft rotates in the opposite direction the spring decompresses. Thus, when the shaft rotates in one direction, the spring exerts a torsional force in one direction, and when rotated in the opposite direction the spring exerts a torsional force in the opposite direction. In the presently preferred embodiment, the torsion spring is a right-wound spring.

Figure 8:
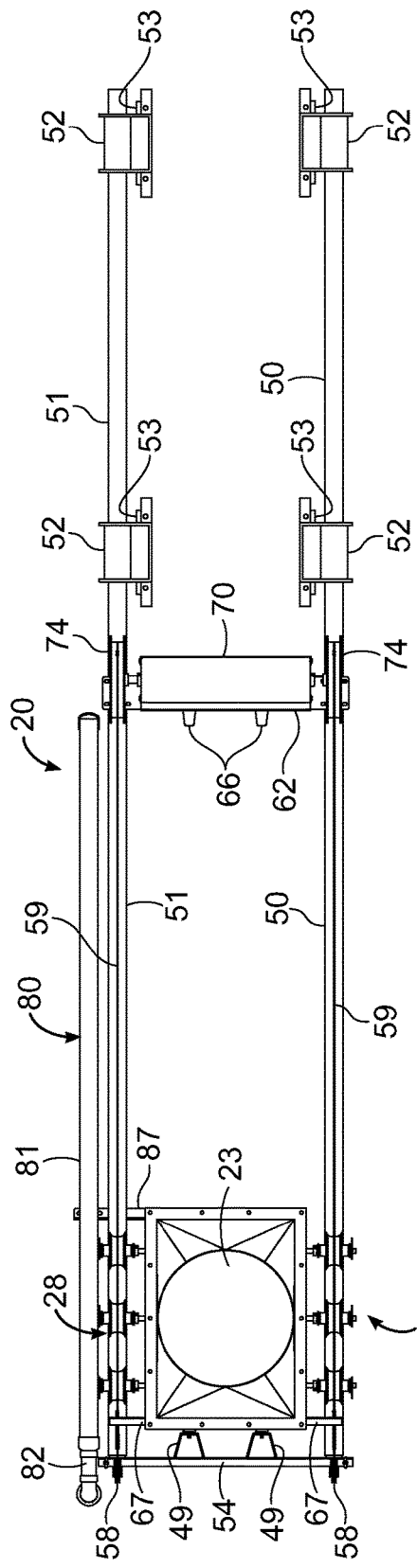
FIG. 8 is a top plan view of a dust control device in accordance with an example embodiment.
Figure 19:
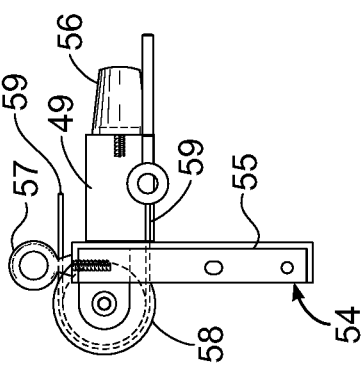
FIG. 19 is a longitudinal end view of a back channel plate and components of a dust control device in accordance with an example embodiment.
Figure 17:
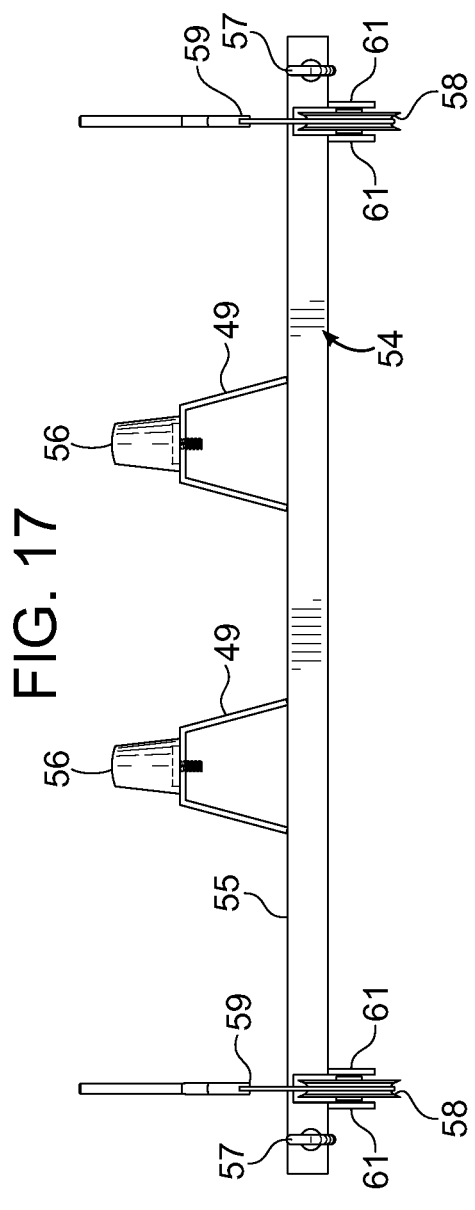
FIG. 17 is a top plan view of a back channel plate and components of a dust control device in accordance with an example embodiment.
Figure 18:
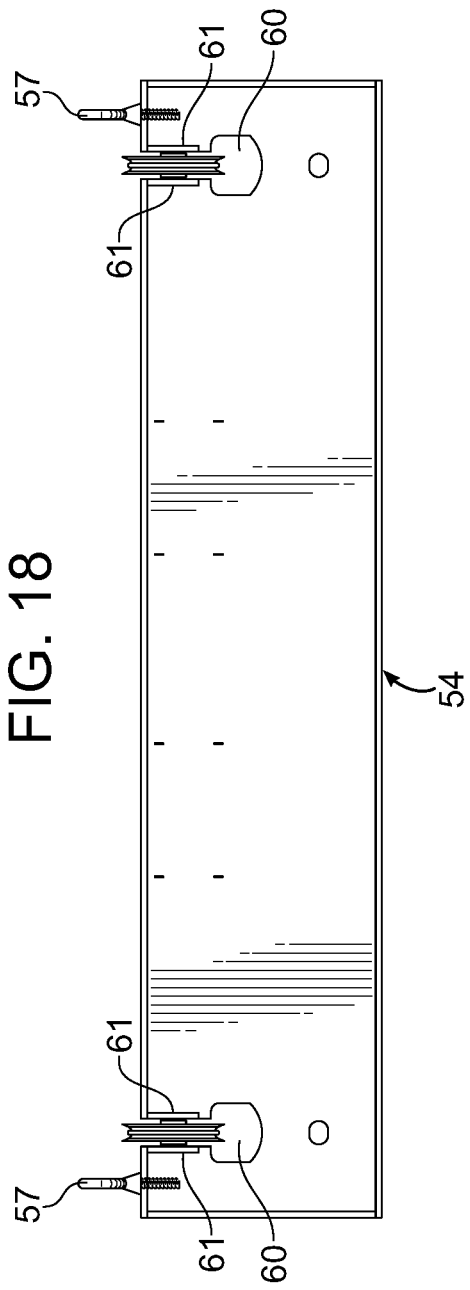
FIG. 18 is a side perspective view of a back channel plate and components of a dust control device in accordance with an example embodiment.
Figure 20:
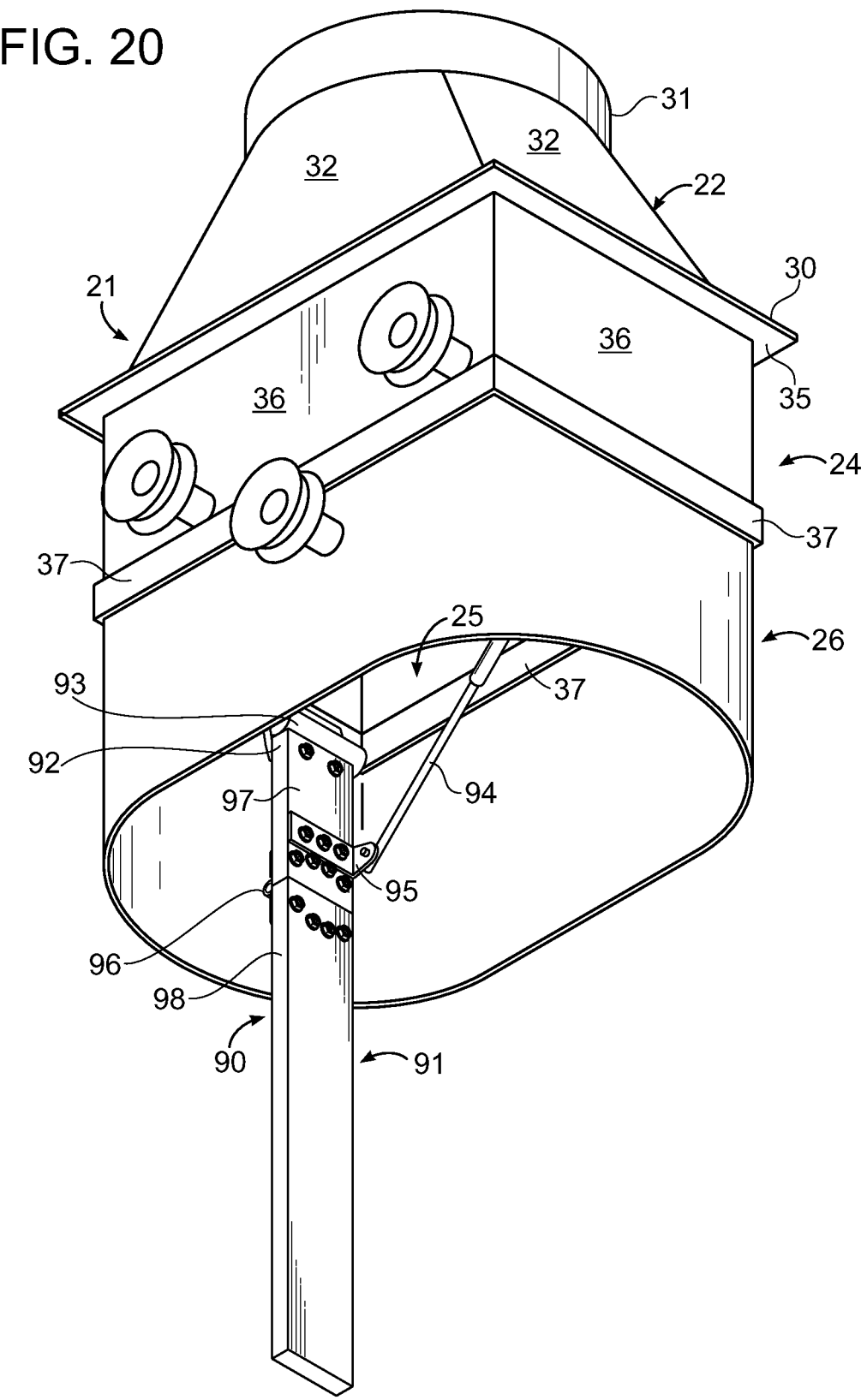
FIG. 20 is an upward angled perspective view of a dust hood of a dust control device in accordance with an example embodiment with a connected dust hood engagement structure.
Figure 21:
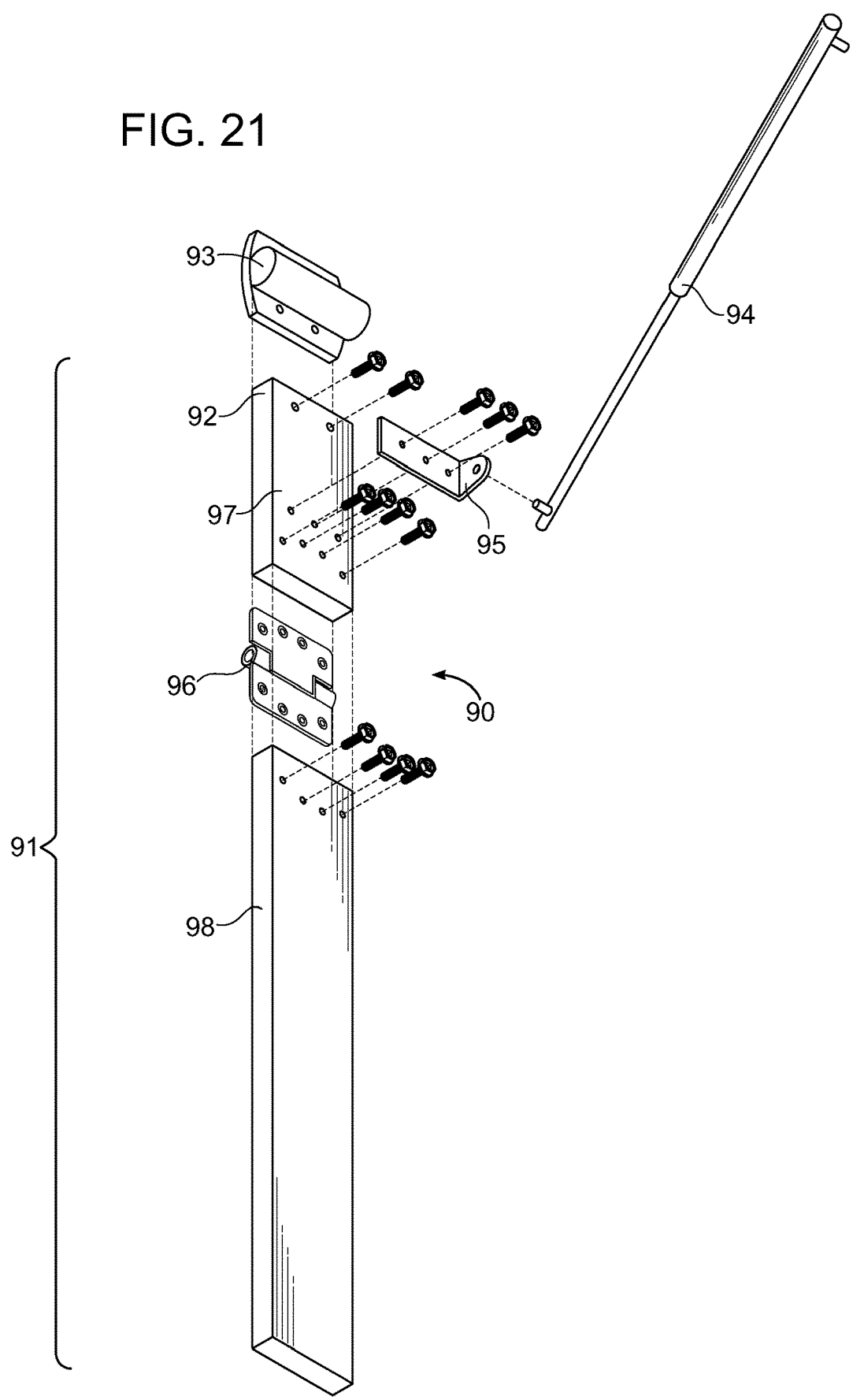
FIG. 21 is an exploded perspective view of the dust hood engagement structure shown in FIG. 20.
Figure 22:
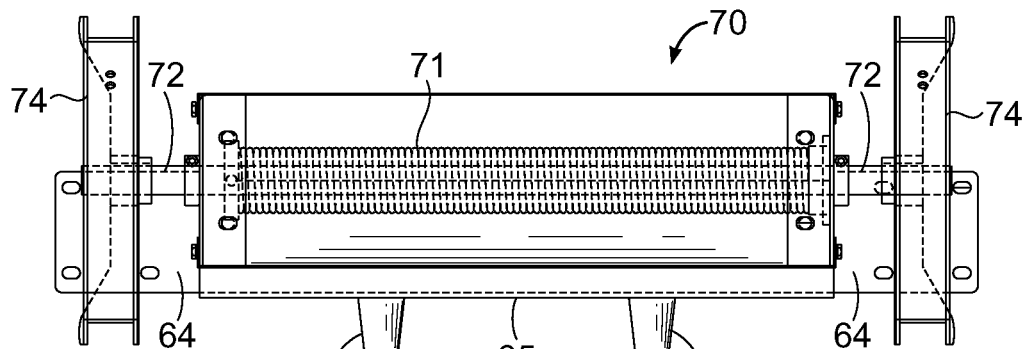
FIG. 22 is a top plan view of a spring-biased positioning assembly and mount of a dust control device in accordance with an example embodiment.
Figure 23:
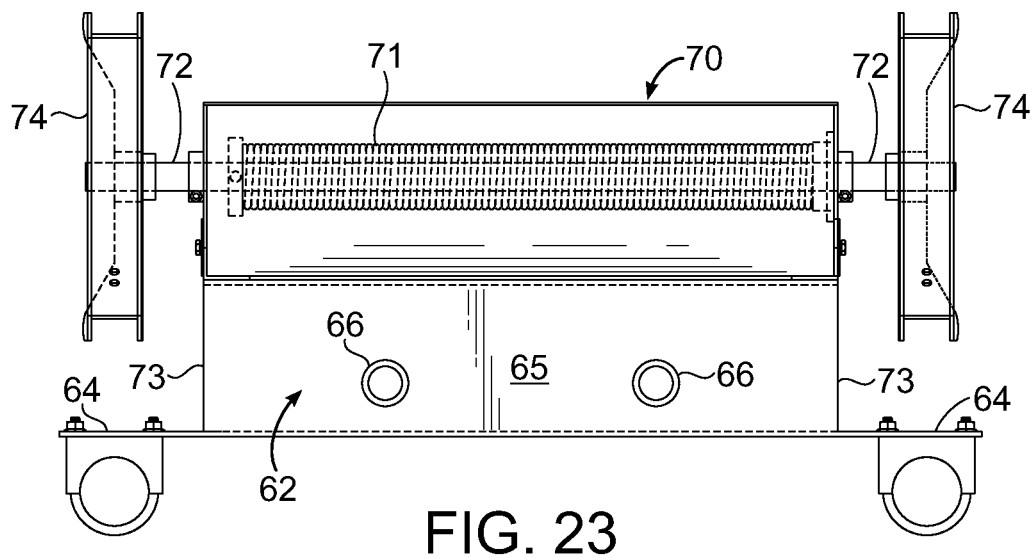
FIG. 23 is a side perspective view of a spring-biased positioning assembly and mount of a dust control device in accordance with an example embodiment.
Figure 24:
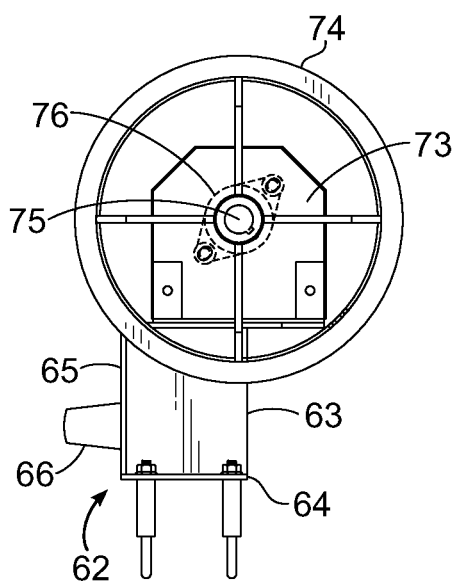
FIG. 24 is a longitudinal end view of a spring-biased positioning assembly, mounting bracket and mount of a dust control device in accordance with an example embodiment.
Figure 25:
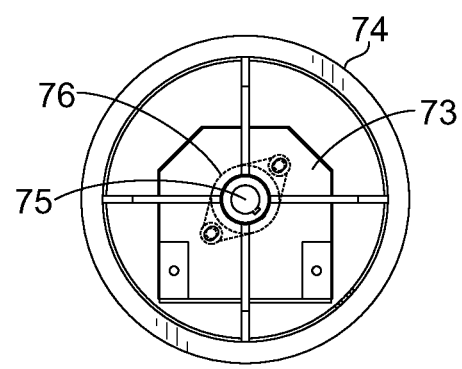
FIG. 25 is a longitudinal end view of a spring-biased positioning assembly and mounting bracket of a dust control device in accordance with an example embodiment.
Figure 28:
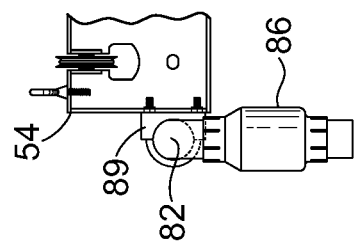
FIG. 28 is a longitudinal end view of a damper, connected support bracket, and back channel plate of a dust control device in accordance with an example embodiment rotated by 180 degree from the view in FIG. 27.
Figure 27:
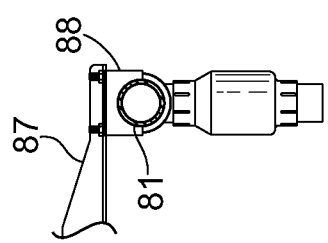
FIG. 27 is a longitudinal end view of a damper and connected support bracket of a dust control device in accordance with an example embodiment.
Figure 26:
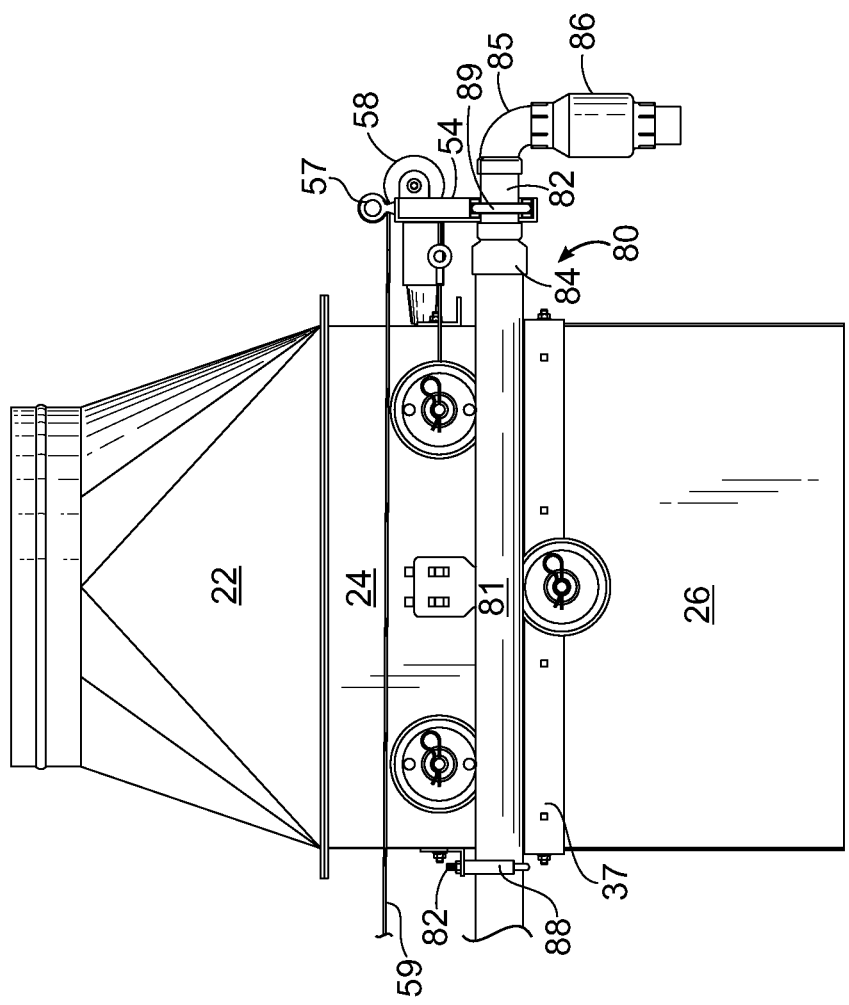
FIG. 26 is a side perspective view of a dust hood of a dust control device in accordance with an example embodiment with a damper mounted.

The pulley wheels 74 are mounted on the opposite ends of the shaft 72 that extend laterally from the mounting brackets 73. The pulley wheels are securely mounted to the shaft using shaft collars and keys, or other suitable hardware, and rotate with the shaft. As best seen in FIG. 8, the pulley wheels are laterally positioned on the laterally extending ends of the shaft in longitudinal alignment with the corresponding support rails 50, 51, dust hood wheel sets 27, 28, and pulley wheels 58 mounted on the back channel plate 54.

Referring primarily to FIGS. 1-4, 7, 8, 17, and 19, a free end of each wire rope or cable 59 is securely fastened to a corresponding pulley wheel 74 and a length of the wire rope or cable is spooled around the wheel. The other free end of each wire rope is routed longitudinally above a corresponding support rail 50, 51, over the upper wheels 38 of a corresponding wheel set 27, 28, and onto the top extent of a corresponding pulley wheel 58 mounted on the back channel plate 54. The free end of each wire rope is looped around the corresponding pulley wheel 58, passed through the corresponding pulley slot 60 in the back channel plate, and securely connected to a corresponding extension arm 67 that extends laterally from the vertical side wall 36 of the lower section 24 of the dust hood 21 that faces the back channel plate 54. The free end of each wire rope may be connected to the corresponding extension arm directly or with suitable eye bolts, cable clamps, turnbuckles, or the like. Such hardware can be useful in helping to adjust the tension on the wire rope. Connecting the free end of each wire rope to a laterally extending arm attached to the dust hood rather than directly to a surface of the dust hood ensures that the wire rope follows a substantially linear path all the way from the spring-biased positioning assembly 70 to the dust hood 21. This helps ensure proper tracking of the dust hood on the support rails and helps prevent the wire rope from going off track and possibly being damaged during operation.

The wire ropes 59 are preferably tensioned sufficiently so that when the dust hood is in the ready position in contact with the bumper stops 56 of the back channel plate 54, the wire ropes remain substantially horizontal along the path from the spring-biased positioning assembly to the dust hood. It is preferred to avoid substantial sag in the wire ropes to avoid them catching on other components during operation and to prevent the dust hood being jerked into movement after any excess slack in the wire ropes is taken up.

In addition, it is preferred that the spring-biased positioning assembly 70 be adjusted to exert sufficient torsional force on the pulley wheels 74 so that the wire ropes 59 pull the dust hood against the bumper stops 56 of the back channel plate 54 when the dust hood is in the ready position in the absence of a rail car. At the same time, it is preferred that the torsional force be limited so that when a rail car to be loaded passes beneath and engages the dust hood as described in detail below, the force holding the dust hood in the ready position is less than the motive force of the rail car on the dust hood so that the dust hood is able to move with the rail car from the ready position to the operational position in close proximity to the deliver spout as described herein. As persons skilled in the art will appreciate, the force exerted by the spring-biased positioning assembly can be adjusted by adjusting the tension of the torsion spring 71. If turnbuckles or other tensioning devices are used to connect the wire ropes to the dust hood, they also can be used to adjust the tension of the wire ropes and thus the force exerted by the positioning assembly.

Referring primarily to FIGS. 1-4, 7-8, 26-28, a damper 80 helps control the movement of the dust hood between the operational and ready positions. In the presently preferred embodiment, the damper is an air damper comprising a pair of elongated horizontal pipes. An outer pipe 81 runs outside of and alongside one of the elongated support rails 50, 51. An inner pipe 82 is concentric with and extends inside the outer pipe. A first end of the outer pipe terminates near where the mount 62 interconnects the support rails 50, 51. The first end of the outer pipe is terminated in a closed cap 83. A second opposite end of the outer pipe terminates just short of where the distal ends of the support rails connect to the back channel plate 54 as described above. A first end of the inner pipe extends inside the outer pipe and terminates short of the location where the first end of the outer pipe terminates leaving an air space between the respective first ends of the pipes. A second opposite end of the inner pipe extends outwardly from the second end of the outer pipe through a reducing pipe fitting 84. The pipe fitting holds the inner pipe snugly relative to the outer pipe while still allowing the outer pipe to slide over the inner pipe. The second end of the inner pipe extends slightly past the back channel plate 54 and terminates in a 90 degree fitting 85 and a check valve 86.

The inner and outer pipes may be supported in a variety of ways provided the supports permit the outer pipe to slide over the inner pipe as described below. In the presently preferred embodiment, a support bracket 87 extends laterally from the vertical side wall 36 of the lower section 24 of the dust hood 21 that faces the delivery spout 16. Attached to the support bracket is a downward facing U-bolt 88 or similar component. The outer pipe extends through and is supported by the U-bolt and bracket. The U-bolt is tightened to securely hold the outer pipe so that it is able to move with movement of the dust hood on the support rails and slide over the inner pipe. A second U-bolt 89 or other similar component is attached to and extends laterally from the back channel plate 54. The inner pipe extends through and is supported by the U-bolt 89. The U-bolt 89 is tightened to securely hold the inner pipe so that the inner pipe remains stationary as the outer pipe slides over it with movement of the dust hood.

As the dust hood moves from the ready position to the operational position, the outer pipe 81 slides over the inner pipe 82 toward the operational position. This movement creates a suction that draws air into the damper through the check valve 86. The check valve prevents the air from escaping while the dust hood remains in the operational position. As the dust hood moves from the operational position back toward the ready position under the force of the spring-biased positioning assembly 70, the outer pipe slides over the inner pipe toward the ready position and forces the air trapped in the damper out through the reducing pipe fitting 84. This creates a back pressure and exerts a force on the dust hood that is counter to the force exerted by the spring-biased positioning assembly and that resists movement of the dust hood toward the ready position. The counter force helps slow the movement of the dust hood so that it remains in proximity to the location where grain is being delivered for a longer time. It also helps dampen the speed and force with which the dust hood returns to the ready position and engages the bumper stops 56 of the back channel plate 54.

F. Dust Hood Engagement Structure

Referring primarily to FIGS. 1-5, 7, and 20-21, the dust hood engagement structure 90 comprises an elongated arm 91 that extends downwardly from the lower section 24 of dust hood 21 below the skirt 26 and into the path of travel of a rail car to be loaded with grain as it approaches and passes beneath the delivery spout 16. The elongated arm 91 may take many forms consistent with the functions and purposes described herein. In a presently preferred embodiment, the arm comprises a substantially rectangular-shaped component with a length that is much greater than its width and thickness, similar to what is often referred to as a "1×4." The length of the arm may vary depending on the specifics of the elevator, delivery spout, and rail cars with which it is intended for use. Preferably, however, the arm is at least long enough to be engaged by the bulkheads separating the internal compartments of rail cars passing beneath the dust hood as they approach the delivery spout for loading. Also preferably, the elongated arm is constructed of a material that is rigid, and abrasion and impact resistant. An ultra-high molecular weight polyethylene (UMHW) plastic is a presently preferred material having these characteristics.

The elongated arm 91 is connected at its upper end 92, by a hinge 93 to the inside surface of the vertical side wall 36 of the lower section 24 of the dust hood 21 that faces the back channel plate 54. The hinge 93 allows the elongated arm to pivot forward in the direction of movement of a rail car 12 that engages it as the car passes beneath the dust hood toward the delivery spout 16. One end of a force-generating cylinder 94, such as a suitable pneumatic or hydraulic cylinder, is attached to the elongated arm below the hinged connection via a bracket 95 or other suitable connecting component. The other end of the cylinder is connected to the inside surface of another one of the vertical side walls 36 of the dust hood 21 at a point higher than where the first end is connected to the elongated arm. In this arrangement, the cylinder exerts an angled downward force that opposes forward pivoting motion by the elongated arm. This helps to maintain the elongated arm in contact with the rail car in engagement with it as the rail car and dust hood move together toward the delivery spout.

If desired, an additional safety hinge 96 can be incorporated to protect the elongated arm, related components, and the dust hood from damage in the event a rail car engaged with the arm reverses direction. Without the safety hinge, reverse movement of the rail car could cause the elongated arm to pivot backward beyond the limits of the hinge 93 and cylinder 94, and could result in damage to these components and to the dust hood itself. To prevent this, the elongated arm can be separated into an upper arm section 97 and a lower arm section 98. In this arrangement, the upper arm section includes the hinge 93 and cylinder 94 connections. The lower arm section is connected to the upper arm section by the safety hinge 96, which preferably comprises a self-closing hinge. The self-closing safety hinge is connected so that when the elongated arm pivots forward on the hinge 93 the self-closing safety hinge 96 is in the self-closing state and the upper and lower arm sections 97, 98 remain aligned with each other. However, when the elongated arm pivots in the reverse direction and reaches the limit of rotation of the hinge 93, any additional rearward force on the lower arm section 98 causes the self-closing safety hinge 96 to open, which allows the lower arm section to continue pivoting in the reverse direction without the upper arm section 97 pivoting further, thus avoiding damage.

G. Operation of Preferred Embodiment

Referring primarily to FIGS. 1-4, in use the dust hood 21 is moveably supported on the elongated support rails 50, 51 above the path of travel of a rail car 12 to be loaded with grain as it approaches and passes beneath the delivery spout 16 of an elevator 10. Initially, the dust hood is maintained in a ready position in engagement with the bumper stops 56 of the back channel plate 54 under the force of the spring-biased positioning assembly 70. In this position, the elongated engagement arm 91 extends downwardly from the dust hood into the path of the rail car as it approaches the delivery spout.

As the rail car passes under the dust hood and approaches the delivery spout, a component of the rail car, typically a bulkhead ring, engages the elongated engagement arm. The rail car continues moving toward the delivery spout so that the top opening of an internal compartment of the car to be loaded is aligned under the delivery spout. As the rail car continues to move, the engagement arm pivots forward on its hinged connection 93 to the dust hood and the downward force exerted on the arm by the cylinder 94 maintains the elongated arm in engagement with the bulkhead ring. This in turn causes the dust hood to move on the support rails via the rotatable wheel sets 27, 28 away from the ready position and toward the operational position. As the rail car continues approaching and begins to pass under the delivery spout, the dust hood moves into the operational position in close proximity to the delivery spout in contact with the bumper stops 66 connected to the mount 62.

The dust hood moves toward and into the operational position with and under the motive force of the rail car, which is sufficient to overcome the force exerted on the dust hood by the spring-biased positioning assembly 70. As the dust hood moves toward the operational position, the damper 80 draws air in through the check valve 86. While the dust hood remains in the operational position, the check valve prevents the air from escaping.

In the operational position, the dust hood 21 is in close proximity to the delivery spout 16. As the delivery spout delivers the grain into an internal compartment 13 of the rail car a significant amount of dust is generated. The dust hood substantially captures the dust and substantially prevents its escape into the atmosphere. With the top opening 23 of the dust hood connected by a flexible hose to a dust containment apparatus of the loading facility, the captured dust is directed from the dust hood to the dust containment apparatus for processing.

As one compartment 13 of the rail car is loaded, the car continues to move to align the top opening 15 of the next compartment to be loaded beneath the delivery spout 16. If or as a bulkhead or other component of the rail car loses engagement with the elongated engagement arm, the engagement arm pivots rearward to its starting position and the dust hood automatically returns to the ready position under the force exerted by the spring-biased positioning assembly. As the dust hood moves from the operational position toward the ready position, the air previously drawn into the damper 80 is forced out creating a back pressure and counter-force that slows the speed of the dust cover so it remains in proximity to where the loading is occurring for a longer time. It also dampens the speed and force with which the dust hood returns to the ready position and engages the bumper stops 56 of the back channel plate 54.

Upon its return to the ready position, the dust hood is ready to be engaged again by a bulkhead of another compartment of the same or another car to be loaded. Once engaged, the process as described above repeats.

Unless otherwise defined, all technical and scientific terms used herein have the same meaning as commonly understood by one of ordinary skill in the art to which this invention belongs. Although methods and materials similar to or equivalent to those described herein can be used in the practice or testing of the dust control device, suitable methods and materials are described above. All publications, patent applications, patents, and other references mentioned herein are incorporated by reference in their entirety to the extent allowed by applicable law and regulations.

The dust control device may be embodied in other specific forms without departing from the spirit or essential attributes thereof. In addition, various components described herein as integral may alternatively comprise multiple attached components unless otherwise specified, and components described as being separate may alternatively be combined as a single integral component unless otherwise specified. It is therefore desired that the present embodiment be considered in all respects as illustrative and not restrictive. Any headings utilized within the description are for convenience only and have no legal or limiting effect.

What is claimed is:

1. A dust control device for use with a facility having a delivery spout for delivering a commodity to a moveable vehicle, comprising:
    a hood adapted to capture dust generated during delivery of the commodity to the vehicle;
    a support for the hood, wherein the support is adapted to be connected to the facility; and
    an engagement mechanism connected to the hood and adapted to be engaged by the vehicle;
    wherein the hood is moveable on the support between a first position that is removed at a distance from the delivery spout and a second position that is in proximity to the delivery spout with movement of the vehicle to the delivery spout with the vehicle in engagement with the engagement mechanism.

2. The dust control device of claim 1 wherein the hood comprises a bottom opening adapted to capture the dust and a top opening adapted for connection to a remote dust containment apparatus.

3. The dust control device of claim 2 wherein the hood comprises a flexible skirt around the bottom opening.

4. The dust control device of claim 1 wherein the hood comprises a plurality of rotatable wheels and wherein the hood is moveable on the support on the wheels.

5. The dust control device of claim 1 wherein the support comprises a pair of elongated rails.

6. The dust control device of claim 5 wherein each rail of the pair of rails has a first distal end and a second proximal end, wherein the first position is at or near the first distal end, wherein the second position is at or near the second proximal end, and wherein each rail of the pair of rails is adapted to be connected to the delivery spout of the facility at or near the second proximal end.

7. The dust control device of claim 6 comprising a first stop and a second stop, wherein the first stop is connected between the distal ends of the rails comprising the pair of rails at the first position, and the second stop is connected between the rails comprising the pair of rails at the second position.

8. The dust control device of claim 7 wherein the hood is reciprocally moveable between the first stop and the second stop.

9. The dust control device of claim 8 including a positioning assembly, wherein the positioning assembly is connected to the dust hood, and wherein the positioning assembly is operative to automatically cause the dust hood to move into the first position adjacent the first stop when the vehicle is not in engagement with the engagement mechanism.

10. The dust control device of claim 9 wherein the positioning assembly comprises:
    a spring under tension;
    a pulley wheel coupled to the spring; and
    a wire connected between the pulley wheel and the hood.

11. The dust control device of claim 10 comprising a damper connected between the hood and the support and operative to control movement of the hood into the first position.

12. The dust control device of claim 1 wherein the engagement mechanism comprises:
    an elongated arm adapted to extend into a path of travel to be traversed by the vehicle as it moves toward the delivery spout and to be engaged by the vehicle, wherein the arm is pivotably connected to the hood and is adapted to pivot relative to the hood when engaged by the vehicle; and
    a gas piston connected to the elongated arm and adapted to apply a downward force to the arm when it is engaged and caused to pivot by the vehicle.

13. The dust control device of claim 1 wherein the hood is reciprocally moveable between the first position and the second position.

14. The dust control device of claim 1 including a positioning assembly, wherein the positioning assembly is connected to the dust hood, and wherein the positioning assembly is operative to automatically cause the dust hood to move into the first position when the vehicle is not in engagement with the engagement mechanism.

15. The dust control device of claim 1 comprising a damper connected between the hood and the support, wherein the damper is operative to control movement of the hood into the first position.

16. The dust control device of claim 1 wherein the engagement mechanism comprises an elongated arm adapted to extend from the hood and to be engaged by the vehicle.

17. The dust control device of claim 16 wherein the elongated arm is pivotably connected to the hood and is adapted to pivot relative to the hood when engaged by the vehicle.

18. The dust control device of claim 16 wherein the engagement mechanism comprises a gas piston connected to the hood and to the elongated arm and adapted to apply a downward force to the arm when the arm is engaged by the vehicle.

19. A dust control device for use with a facility having a delivery spout for delivering a commodity to a moveable vehicle, comprising:
    a pair of elongated support rails, wherein each support rail has a proximal end, wherein the pair of support rails extends longitudinally over a path of travel that approaches and passes under the delivery spout, and wherein the proximal ends are adapted to be connected to the delivery spout;
    a first stop connected to the pair of support rails at a first position longitudinally spaced from the delivery spout;
    a second stop connected to the pair of support rails at a second position in proximity to the delivery spout;
    a hood having a bottom opening adapted to capture dust, a top opening adapted to be connected to a remote dust containment apparatus of the facility, and a plurality of rotatable wheels, wherein the hood is moveably supported by the wheels on the support rails, and wherein the hood is reciprocally moveable on the support rails between the first stop and the second stop;
    an elongated engagement arm connected to the hood and extending generally downward into the path of travel, wherein the arm is adapted to be engaged by a moveable vehicle traversing the path of travel;
    a positioning assembly connected to the dust hood and operative to automatically cause the dust hood to move to the first position when a vehicle is not in engagement with the engagement arm; and
    wherein the hood is adapted to move on the support rails to the second position when a vehicle traverses the path of travel into proximity with the delivery spout while in engagement with the engagement arm.

20. The dust control device of claim 19 wherein the hood comprises a flexible skirt around the bottom opening.

21. The dust control device of claim 20 wherein the positioning assembly comprises:
    a spring under tension;
    a pulley wheel coupled to the spring; and
    a wire connected between the pulley wheel and the hood.

22. The dust control device of claim 21 comprising a damper connected to the hood and operative to control movement of the hood to the first position.

23. The dust control device of claim 22 wherein the damper comprises an air damper.

24. The dust control device of claim 23 wherein the damper comprises:
    a first pipe having a first proximal end and a second distal end, wherein the first pipe is elongated and moveable, and a second pipe having a first proximal end and a second distal end, wherein the second pipe is elongated and stationary;
    wherein the first proximal end of the first pipe is closed, wherein the first proximal end of the second pipe extends within the second distal end of the first pipe, and wherein the first pipe is slideable over the second pipe;
    a fitting moveably coupling the second pipe within the second distal end of the first pipe;
    a check valve connected to the second distal end of the second pipe;
    wherein the first pipe is securely connected to the hood and the second pipe is securely connected to the second stop such that the second pipe is stationary and the first pipe is slideable over the second pipe with movement of the hood;
    whereby when the hood moves toward the second position air is drawn into the first pipe through the check valve and when the hood moves toward the first position the air is forced out of the first pipe through the fitting to create a force resisting movement of the hood to the first position.

25. The dust control device of claim 19 wherein the engagement arm is pivotably connected to the hood and is adapted to pivot relative to the hood when engaged by the vehicle, and wherein a gas piston is connected to the elongated arm and adapted to apply a downward force to the arm to urge it into contact with the vehicle when it is engaged and caused to pivot by the vehicle.

26. A dust control device for use with a facility having a delivery spout for delivering a commodity to a moveable vehicle, comprising:
- a hood adapted to capture dust generated during delivery of the commodity to the vehicle, wherein the hood comprises a bottom opening adapted to capture the dust, a flexible skirt around the bottom opening, a top opening adapted for connection to a remote dust containment apparatus, and a plurality of rotatable wheels;
- a support for the hood, wherein the support is adapted to be connected to the facility; and
- an engagement mechanism connected to the hood and adapted to be engaged by the vehicle;
- wherein the hood is moveable on the support on the plurality of rotatable wheels between a first position that is removed at a distance from the delivery spout and a second position that is in proximity to the delivery spout with movement of the vehicle to the delivery spout with the vehicle in engagement with the engagement mechanism.

27. The dust control device of claim 26 wherein the support comprises a pair of elongated rails.

28. The dust control device of claim 27 wherein each rail of the pair of rails has a first distal end and a second proximal end, wherein the first position is at or near the first distal end, wherein the second position is at or near the second proximal end, and wherein each rail of the pair of rails is adapted to be connected to the delivery spout of the facility at or near the second proximal end.

29. The dust control device of claim 28 comprising a first stop and a second stop, wherein the first stop is connected between the distal ends of the rails comprising the pair of rails at the first position, and the second stop is connected between the rails comprising the pair of rails at the second position.

30. The dust control device of claim 26 wherein the hood is reciprocally moveable between the first position and the second position.

31. The dust control device of claim 26 including a positioning assembly, wherein the positioning assembly is connected to the dust hood, and wherein the positioning assembly is operative to automatically cause the dust hood to move into the first position when the vehicle is not in engagement with the engagement mechanism.

32. The dust control device of claim 26 comprising a damper connected between the hood and the support and operative to control movement of the hood into the first position.

33. The dust control device of claim 26 wherein the engagement mechanism comprises an elongated arm adapted to extend from the hood and to be engaged by the vehicle.

34. The dust control device of claim 33 wherein the elongated arm is pivotably connected to the hood and is adapted to pivot relative to the hood when engaged by the vehicle.

35. The dust control device of claim 33 wherein the engagement mechanism comprises a gas piston connected to the hood and to the elongated arm and adapted to apply a downward force to the arm when the arm is engaged by the vehicle.

* * * * *